United States Patent [19]
Sarder et al.

[11] Patent Number: 5,833,255
[45] Date of Patent: Nov. 10, 1998

[54] BICYCLE SEAT SUSPENSION

[75] Inventors: Mark Sarder, Waukesha; David R. Voves, Mukwonago, both of Wis.

[73] Assignee: Team Vision, Mukwonago, Wis.

[21] Appl. No.: 668,444

[22] Filed: Jun. 20, 1996

[51] Int. Cl.$^6$ .................................................. B62M 1/00
[52] U.S. Cl. ...................... 280/220; 280/283; 297/195.1
[58] Field of Search ................................... 280/275, 283, 280/220; 297/195.1, 196, 209, 211

[56] References Cited

U.S. PATENT DOCUMENTS

| | | |
|---|---|---|
| 1,239,211 | 9/1917 | Parks . |
| 1,416,912 | 5/1922 | Brooks . |
| 2,949,153 | 8/1960 | Hickman . |
| 3,314,672 | 4/1967 | Persson . |
| 4,456,295 | 6/1984 | Francu . |
| 4,736,983 | 4/1988 | Furbee . |
| 4,934,724 | 6/1990 | Allsop et al. . |
| 5,029,888 | 7/1991 | Allsop et al. . |
| 5,044,648 | 9/1991 | Knapp . |
| 5,095,840 | 3/1992 | Kramer .................................... 114/219 |
| 5,316,259 | 5/1994 | Pawlykowych et al. . |
| 5,346,235 | 9/1994 | Holman . |
| 5,464,271 | 11/1995 | McFarland ............................... 297/209 |
| 5,489,139 | 2/1996 | McFarland . |
| 5,529,326 | 6/1996 | Hwang .................................. 297/195.1 |

FOREIGN PATENT DOCUMENTS

| | | |
|---|---|---|
| 569230 | 7/1924 | France . |
| 152186 | 9/1903 | Germany . |
| 151915 | 10/1920 | United Kingdom . |
| 154369 | 12/1920 | United Kingdom . |

OTHER PUBLICATIONS

Seatpost Buyer's Guide,; Mountain Biker; Feb. 1996; pp. 53–59.

*Primary Examiner*—Stephen Avila
*Attorney, Agent, or Firm*—Ryan, Maki, Mann & Hohenfeldt

[57] ABSTRACT

A bicycle seat suspension includes a parallelogram linkage having one end mounted to a seat post and another end supporting a saddle. A resilient member between opposed members of the parallelogram linkage deforms during linkage displacement to absorb shocks and to provide a restoring force to the linkage. An adjustment mechanism adjusts the initial preload on the resilient member to adapt the suspension system to varying terrain and riding conditions. The resilient member is also configured to provide varying restoring forces at varying degrees of compression to further adapt the suspension to varying riding conditions. The various members of the parallelogram linkage are configured for strength, light weight and manufacturing economy. A universal sleeve and shim arrangement is provided for adapting the seat suspension for use with bicycles having frames formed of tubing of different diameters.

22 Claims, 4 Drawing Sheets

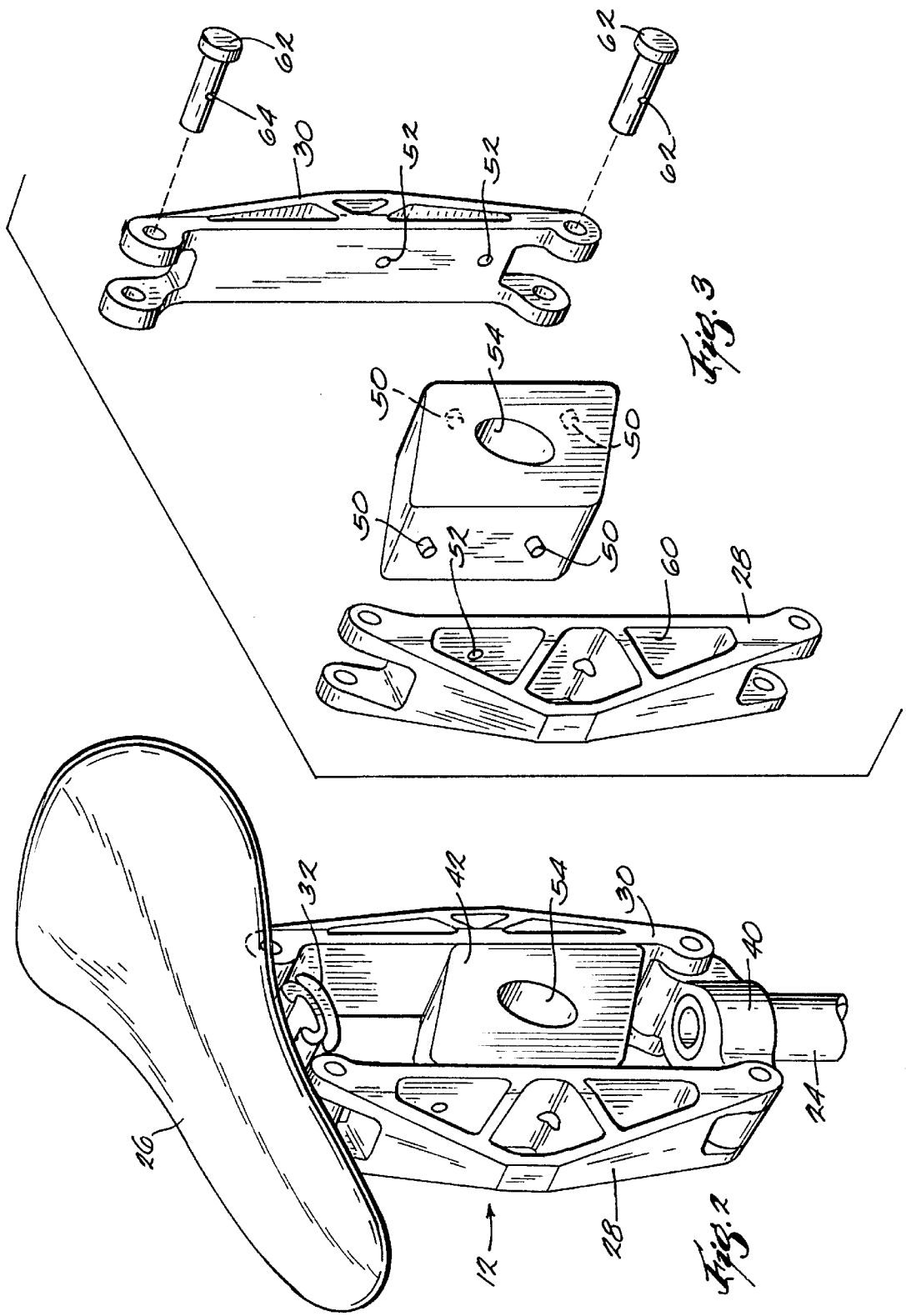

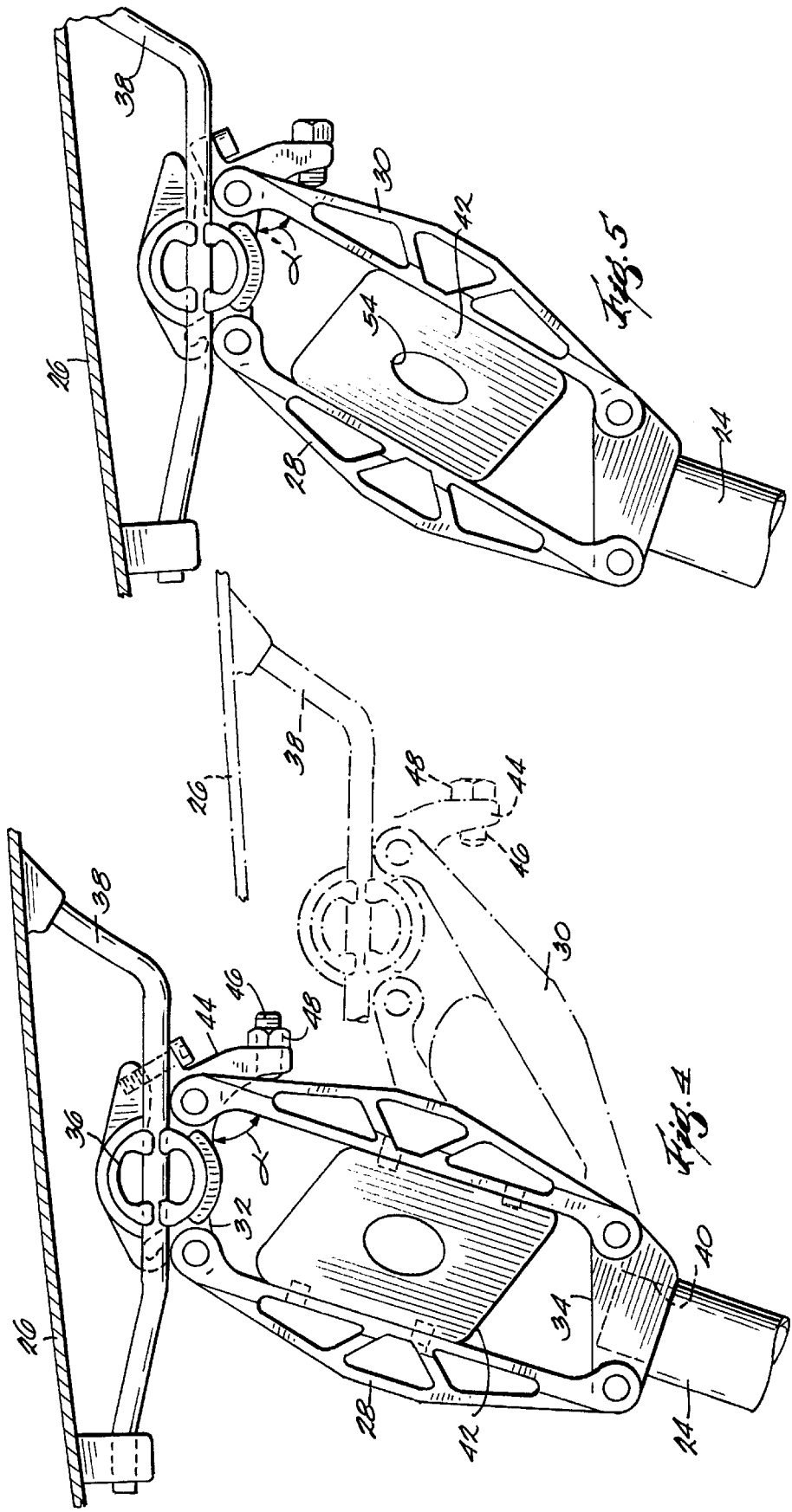

BICYCLE SEAT SUSPENSION

BACKGROUND OF THE INVENTION

This invention relates generally to bicycles and, more particularly, to suspension systems for improving the ride and handling of bicycles.

Various forms of suspension systems have, from time to time, been proposed for bicycles. Generally, such systems seek to improve the riding comfort and handling of bicycles by absorbing shocks or otherwise keeping them from reaching the rider. The need for reducing felt shocks is particularly important for competitive or avid cyclists who engage in extensive "off road" cycling.

Various forms of "front suspension" systems have been devised. These systems typically borrow from similar systems used with motorcycles and usually include some form of spring mechanism incorporated into the front wheel fork of the bicycle. Although generally effective, front suspension systems do not fully compensate for shocks transmitted through the rear wheel of the bicycle.

To further improve riding comfort and handling, "full suspension" systems, wherein both rear and front wheels are configured to absorb shocks, have also been developed. Such full suspensions are highly effective in reducing shocks felt by the rider when riding over bumpy terrain. The chief drawback to full suspension systems, however, is the cost, which can be considerable.

In an effort to provide a lower cost alternative to full suspension systems, efforts have been made to incorporate shock absorbing structures into bicycle seats. Such approaches are advantageous in that the suspensions can be retrofitted into existing bicycles simply by replacing the factory-fitted seats with replacement seats sold in the after-market. In one such form of seat suspension, the seat was supported at the end of an elongate, springy bar. The other end of the bar was clamped to the bicycle frame, thereby supporting the seat much in the same manner as a tractor seat. The springiness of the bar helped absorb shocks transmitted through the bicycle frame. One drawback to this system was that the seat and bar continued to bounce or float long after a bump was encountered. This gave the cyclist a "floating" sensation and a sense of reduced control.

Other efforts in seat suspensions centered on incorporating a spring mechanism into the bicycle seat post. As shocks were encountered, the seat post would compress against the spring to absorb the shock and reduce the felt jolt. Although effective in reducing the felt shock, the compression of the seat post changed the distance between the seat and the bicycle pedals enough to be noticed by the cyclist and thereby disrupt the cyclist's pedaling rhythm. For competitive and other serious cyclists, the disruption of pedaling rhythm was a serious drawback.

One important improvement in the development of seat suspensions was the use of parallelogram linkages between the seat and seat post. Such a parallelogram style seat suspension is shown in U.S. Pat. No. 5,489,139 which issued to McFarland on Feb. 6, 1996. The use of a parallelogram linkage causes the seat to move in an arcuate path around the center of pedaling effort rather than in a linear path along the axis of the seat post. By properly designing the linkage geometry, the saddle angle can be kept constant and the change in seat to pedal distance can be minimized during suspension movement. Parallelogram linkage seat suspensions offer significant advantages over other forms of seat suspensions. Their chief drawback is that they are somewhat complicated in structure and, hence, somewhat expensive to manufacture.

SUMMARY OF THE INVENTION

The invention provides a bicycle seat suspension having a pair of elongate, substantially parallel front and back link members each having an upper end and a lower end. The suspension further includes an upper cross link extending between the upper ends of the front and back link members and a lower cross link extending between the lower ends of the front and back link members. A compressed resilient member is provided between the front and back link members for biasing the front and back link members away from each other, and an adjustment mechanism is provided for adjusting the compression of the resilient member.

The invention also provides a bicycle seat suspension having a pair of elongate, substantially parallel front and back link members each having an upper end and a lower end, an upper cross link extending between the upper ends of the front and back link members and pivotally connected thereto, and a lower cross link extending between the lower ends of the front and back link members and pivotally connected thereto. The front and back link members and the upper and lower cross members form a substantially parallelogram shaped structure, and a compressed resilient member positioned between the front and back link members biases the front and back link members away from each other. A seat saddle is coupled to the upper cross link, and structure is provided on the lower cross link for coupling the lower cross link to a seat post that, in turn, is receivable in a bicycle frame. Each of the front and back link members comprises a truss structure defining a plurality of interior void.

In one embodiment, the resilient member is configured to provide a desired restoring force characteristic in response to compression between the front and back link members.

In one embodiment, the resilient member includes one or more holes for altering the restoring force response.

In one embodiment, the resilient member is formed of two or more elastomeric materials having differing elastomeric properties.

In one embodiment, each of the front and back link members is of greater depth at its center than at its ends.

In one embodiment, each of the front and back link members is shaped so as to be extrudable.

It is an object of the present invention to provide a new and improved parallelogram-type bicycle seat suspension.

It is a further object of the invention to provide a parallelogram-type bicycle seat suspension that can be manufactured economically.

It is a further object of the invention to provide a parallelogram-type bicycle seat suspension that is effective in reducing felt shocks while maintaining uniform pedaling rhythm.

It is a further object of the invention to provide a parallelogram-type bicycle seat suspension that can be adapted to absorb shocks over a variety of riding terrains and conditions.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

FIG. 2 is a perspective view of the seat suspension shown in FIG. 1.

FIG. 3 is an exploded perspective view of the seat suspension.

FIG. 4 is a side elevation view of the seat suspension showing the seat suspension in both an undeflected and deflected condition.

FIG. 5 is a side elevation view similar to FIG. 4 showing the seat suspension in an undeflected position but with a greater initial preload than in FIG. 4.

DESCRIPTION OF THE PREFERRED EMBODIMENT

Figure 1:
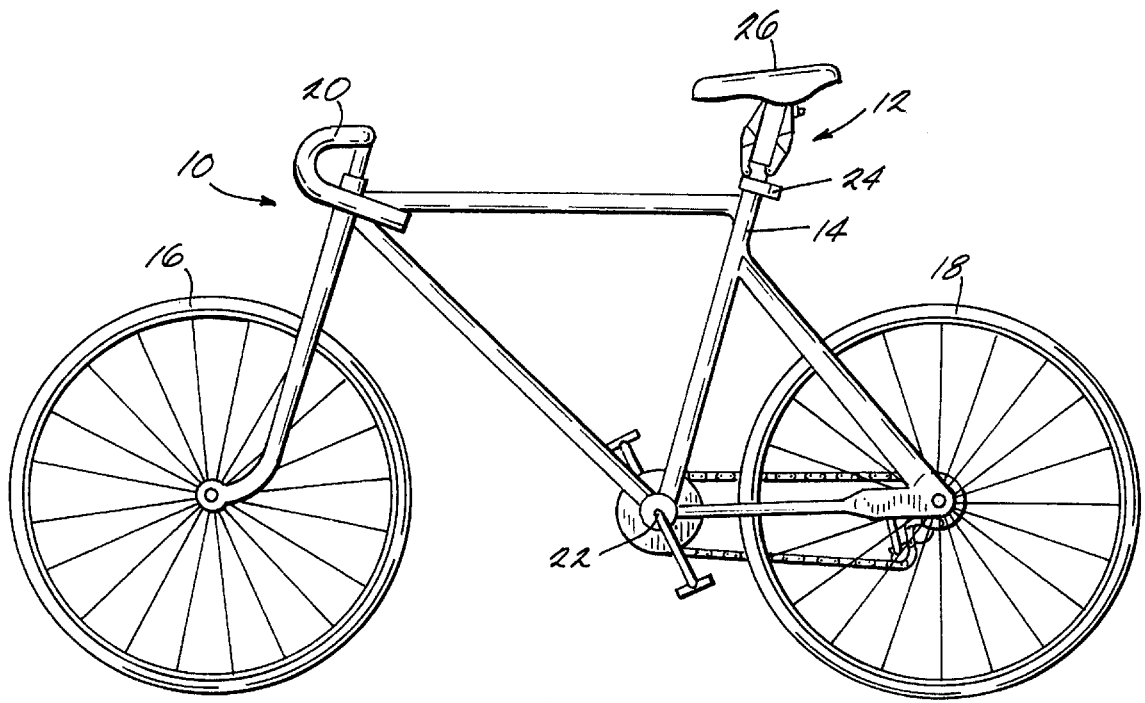
FIG. 1 is a side elevation view of a bicycle having a seat suspension embodying various features of the invention.

Referring to the drawings, FIG. 1 shows a bicycle 10 equipped with a seat suspension 12 embodying various features of the invention. The bicycle 10 shown in FIG. 1 is meant to be illustrative rather than limiting, and it will be appreciated that the seat suspension 12 can be used with bicycles that differ in size, appearance, configuration and intended use from that shown in the figure. In accordance with conventional practice, the bicycle 10 includes a frame 14 supporting front and rear wheels 16, 18, handlebars 20, pedals 22 and a seat post 24. The seat suspension 12 is coupled at its lower end to the seat post 24, and, at its upper end, supports a seat or saddle 26. In addition to supporting the saddle 26, the seat suspension 12 functions to absorb shocks that are encountered by the bicycle 10 and that would otherwise be transmitted through the frame 14 and seat post 24 to the cyclist.

Referring to FIGS. 2–5, the seat suspension 12 includes a parallelogram linkage made up of a front link member 28, a back link member 30, an upper cross link 32 and a lower cross link 34. The upper ends of the front and back link members 28, 30 are pivotally connected to the ends of the upper cross link 32. The lower ends of the front and back link members 28, 30 are pivotally connected to the lower cross link 34. The upper cross link 32 includes a clamp structure 36 that clamps onto mounting rods 38 located on the underside of the saddle 26 to mount the saddle 26 to the upper end of the linkage. The lower cross link 34 includes structure for mounting the lower cross link 34 to the upper end of the seat post 24. In the illustrated embodiment, the structure includes a recess 40 in the lower cross link 34 for receiving the upper end of the seat post 24.

As best seen in FIG. 4, the parallelogram linkage permits the saddle 26 to pivot relative to the upper end of the seat post 24 while maintaining a substantially constant saddle angle (i.e., angle of the saddle relative to the bicycle frame 14) and a substantially constant distance between the saddle 26 and pedals 22. The parallelogram linkage thus permits the saddle 26 to move relative to the bicycle frame 14 without substantially changing the rider's physical orientation relative to the bicycle 10. This avoids upsetting the cyclist's pedaling rhythm and physical interaction with the bicycle.

As further illustrated, the seat suspension 12 includes a resilient member 42 positioned between two of the members of the parallelogram linkage. In the illustrated embodiment, the resilient member is positioned between the front and back link members 28, 30 so as to be compressed when the linkage pivots. The resilient member 42 is preferably molded of a resilient, elastomeric material, such as urethane and develops a restoring force that ordinarily biases the linkage toward the undeflected position shown by the solid lines in FIG. 4. However, when bumps are encountered, the linkage can pivot to the deflected position shown by the broken lines in FIG. 4. This has the effect of momentarily compressing the resilient member 42. In this manner, the resilient member 42 absorbs much of the shock that would otherwise be transmitted through the saddle 26 to the rider. After the shock has passed, the restoring force of the resilient member 42 returns the linkage to the undeflected position.

In accordance with one aspect of the invention, an adjustment mechanism is provided for adjusting the "stiffness" of the seat suspension 12. In the illustrated embodiment, this is accomplished by adjusting the degree to which the resilient member 42 is initially compressed while the linkage is in the undeflected position. This initial compression or "preload" is varied by varying the spacing between the front and back link members 28, 30 when the linkage is undeflected. In the illustrated embodiment, an arm 44 projects from the upper cross link 32 and extends over the upper end of the rear link member 30. The arm 44 receives and supports a threaded member or post 46 that bears against the back link member 30 to fix the maximum acute angle $\alpha$ that the back link member 30 can form relative to the upper cross link 32. By screwing the post 46 in or out relative to the arm 44, the maximum acute angle $\alpha$ can be changed. For example, in FIG. 5, the post 46 has been screwed inwardly to change the angle to a new angle, $\alpha'$ that is less than the angle $\alpha$ shown in FIG. 4. This has the effect of reducing the distance between the front and back link members 28, 30, which has the further effect of increasing the preload of the resilient member 42 and increasing the stiffness of the seat suspension 12. In use, the cyclist can adjust the preload to suit the riding terrain and the cyclist's riding preferences. A lock nut 48 on the post 46 can be used to lock in the preload after an adjustment is made.

The resilient member 42 is preferably shaped in the form of a parallelogram or parallelepiped solid and is oriented as shown relative to the link members 28, 30 and cross members 32, 34. When so shaped and oriented, movement of the parallelogram linkage to the deflected position shown in phantom in FIG. 4 tends to force the resilient member 42 toward a square or rectangular shape from its initial parallelogram shape. As a result, shear forces in the resilient member are reduced and the primary forces on the resilient member 42 are compressive when the seat suspension 12 is in a deflected condition. Preferably, a plurality of protrusions or pins 50 are molded into the resilient member 42 and are received in complementary holes or recesses 52 formed in the front and back link members 28, 30 when the resilient member is properly positioned and mounted within the seat suspension 12. The pins 50 and holes 52 thus serve as an indexing system that properly locates the resilient member 42 relative to the front and back link members 28, 30 and helps keep the resilient member from slipping relative thereto.

In accordance with another aspect of the invention, the resilient member is configured to provide a restoring force that can be varied or otherwise "customized" for a particular terrain or cyclist's preference. In the illustrated embodiment, the resilient member 42 includes a central hole or aperture 54. During the initial stages of deflection when the resilient member is first starting to compress, the hole 54 remains open and the restoring force generated by the resilient member 42 increases at a first rate with increasing compression. During the later stages of compression when the resilient member has deformed sufficiently to effectively "close" the hole 54, the effective absence of the hole causes the restoring force to increase at a rate higher than the first rate with increasing compression. In effect, the suspension is somewhat "soft" when minor bumps are encountered but becomes substantially "stiffer" when larger or stronger bumps are encountered.

Figure 7:
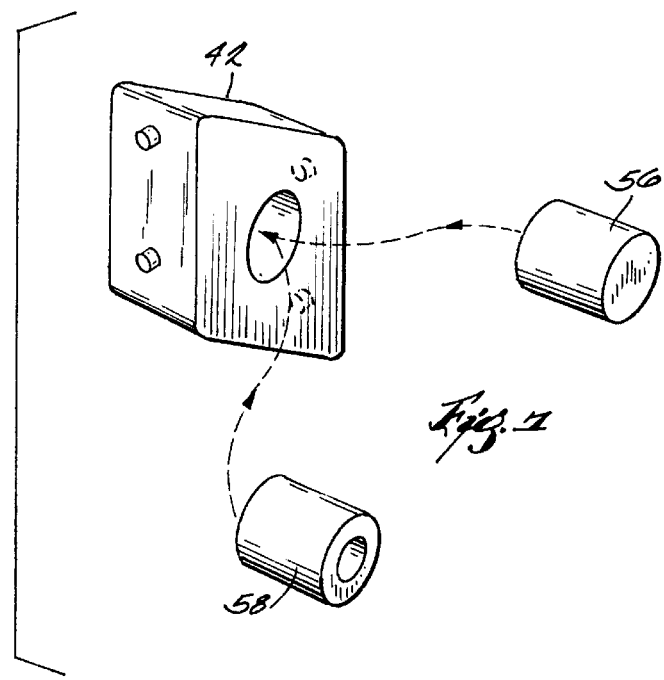
FIG. 7 is a perspective view of a resilient member used in the seat suspension.

It will be appreciated that, although a single central hole 54 has been shown for altering the restoring force response characteristics of the resilient member 42, the response characteristics can be altered and tailored through other means. For example, the size, position and shape of the hole can be varied as needed to obtain the desired response characteristic. Furthermore, a plurality of holes can be used rather than the single hole shown. Additionally, the resilient member 42 can be sculpted or shaped to achieve desired response characteristics. Finally, as shown in FIG. 7, various inserts 56, 58, can be mounted within the hole 54 to change the restoring force response characteristics of the resilient member 42. For example, the inserts 56, 58 can be formed of materials having different elastomeric properties than the material used to form the main body of the resilient member 42. Similarly, the shapes of the inserts 56, 58 can be varied as illustrated, for example, in the case of the solid insert 56 and the hollow insert 58. By using various combinations of inserts, the cyclist can tailor the response characteristics of the resilient member 42 to suit various riding conditions. Again it will be appreciated that, although various forms, shapes and numbers of inserts are shown, other forms, shapes and numbers can be used, and the embodiment shown is meant to be illustrative rather than limiting.

Figure 6:
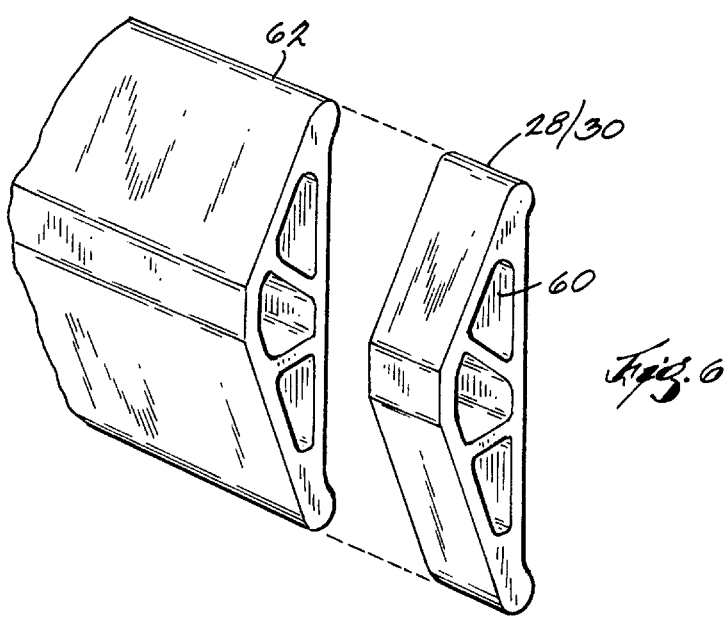
FIG. 6 is a perspective view of a section of extruded stock from which front and back link members used in the seat suspension are cut during manufacture.

In accordance with still another aspect of the invention the seat suspension is configured to enhance performance and manufacturing economy. To this end, the front and back link members 28, 30 are preferably shaped in the form of a truss structure having interior voids 60. Additionally, the depth of each link member 28, 30 is greatest at its center and least at its ends. The truss structure provides substantial strength with relatively light weight, and the tapered ends provides greatest resistance to bending where bending moments are greatest, i.e., at the center of each link member 28, 30. Preferably, the sides of each link member 28, 30 are beveled as best seen in FIGS. 2 and 3 to further reduce weight while maintaining strength. Additionally, the front and back link members 28, 30 are shaped so that they can be formed from extruded stock 62 as shown in FIG. 6. After the stock 62 is extruded, the individual front and back link members 28, 30 can be sliced off and thereafter machined or otherwise shaped. The ability to form the relatively complex truss shape of the front and back link members 28, 30 largely in a simple extrusion process enables to seat suspension 12 to provide optimally shaped components with relatively minimal manufacturing expense. Manufacturing economy is further improved by making the front and back link members substantially identical, and hence interchangeable, with each other. This avoids the need for separate extruding dies, unique machining operations and inventory control in handling the front and back link members 28, 30.

As further shown in FIG. 3, the front and back link members 28, 30, and the upper and lower cross links 32, 34, are pivotally connected to each other by means of suitably shaped and dimensioned pivot pins 62. In accordance with another aspect of the invention, each of the pivot pins 62 includes a hollow interior and a hole 64 extending perpendicularly through the outer surface of the pin 62 and opening into the hollow interior. In use, the hollow interior of each pin is packed with grease or other lubricant and the end of the pin is sealed. The grease flows through the hole 64 to keep the pin lubricated in use.

Figure 8:
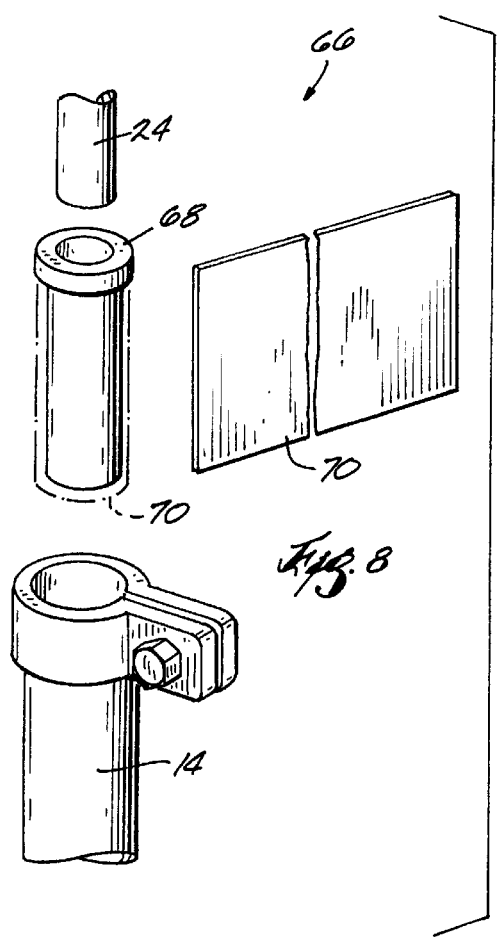
FIG. 8 is an exploded perspective view of an adapter system included in one embodiment of the seat suspension and used to adapt the seat suspension to bicycle frames of different tubular dimensions.

A universal adapter system 66 for mounting the suspension system is shown in FIG. 8. The adapter system allows the suspension system 12 to be adapted for use with a number of bicycle frames formed of different diameter tubing. The diameter of the seat post 24 used in the suspension system 12 remains fixed while the diameter of the frame member 14 in which the seat post is received varies among different bicycle models and manufacturers. The adapter system 66 uses an adapter sleeve 68 of fixed inner and outer diameter. The inner diameter is set so as snugly to receive the seat post 24, and the outer diameter is sufficiently small to allow the sleeve 68 to be received in the narrowest diameter frame tubing likely to be encountered on a bicycle. The gap between the outer diameter of the sleeve 68 and the inner diameter of the frame 14 is taken up by means of a shim 70 formed of a flexible ribbon wrapped around the sleeve 68. The ribbon comprises a flexible, preferably plastic material of known thickness. Knowing the outer diameter of the sleeve 68 and the inner diameter of the frame 14, it is possible to calculate what length of ribbon needs to be wrapped around the sleeve 68 to fill the gap between the sleeve 68 and the frame 14. Accordingly, simply by manufacturing and stocking a single sleeve 68 and supply of ribbon 70, adapters for an extensive variety of bicycles can be fashioned without the manufacturing difficulties associated with making and stocking a similar variety of unique adapters.

While a particular embodiment of the invention has been shown and described, it will be obvious to those skilled in the art that changes and modifications can be made without departing from the invention in its broader aspects, and, therefore, the aim in the appended claims is to cover all such changes and modifications as fall within the true spirit and scope of the invention.

I claim:

1. A bicycle seat suspension comprising:
    a pair of elongate, substantially parallel front and back link members each having an upper end and a lower end;
    an upper cross link extending between the upper ends of the front and back link members;
    a lower cross link extending between the lower ends of the front and back link members;
    a compressed resilient member between the front and back link members biasing the front and back link members away from each other; and
    an adjustment mechanism for adjusting the compression of the resilient member by varying the maximum separation between the front and back link members.

2. A bicycle seat suspension as defined in claim 1 wherein the adjustment mechanism varies the maximum relative acute angle between the upper and lower cross links relative to the front and back link members.

3. A bicycle seat suspension as defined in claim 2 wherein the adjustment mechanism includes an extendible member between one of the upper or lower cross links and one of the front or back link members for establishing the maximum relative acute angle between the upper and lower cross links relative to the front and back link members.

4. A bicycle seat suspension as defined in claim 3 wherein the extendible member comprises a threaded member threadedly engaging one of the upper or lower cross links or front or back link members and bearing against an adjacent one of the upper or lower cross links or front or back link members.

5. A bicycle seat suspension as defined in claim 1 wherein the resilient member is substantially parallelogram shaped and is positioned between the front and back link members so that movement of the front and back link members toward one another tends to force the resilient member from the parallelogram shape toward a rectangular shape.

6. A bicycle seat suspension comprising:
   a pair of elongate, substantially parallel front and back link members each having an upper end and a lower end;
   an upper cross link extending between the upper ends of the front and back link members and pivotally connected thereto;
   a lower cross link extending between the lower ends of the front and back link members and pivotally connected thereto, the front and back link members and the upper and lower cross members forming a substantially parallelogram shaped structure;
   a compressed resilient member between the front and back link members biasing the front and back link members away from each other;
   a seat saddle coupled to the upper cross link; and
   structure on the lower cross link for coupling the lower cross link to a seat post receivable in a bicycle frame;
   each of the front and back link members comprising a truss structure defining a plurality of interior voids.

7. A bicycle seat suspension as defined in claim 6 wherein each of the front and back link members is tapered so as to be of greater depth at its midpoint than at its ends.

8. A bicycle seat suspension as defined in claim 7 wherein each of the front and back link members is shaped so as to be extrudable.

9. A bicycle seat suspension as defined in claim 8 wherein the front and back link members are substantially identical.

10. A bicycle seat suspension system as defined in claim 6 wherein the resilient member includes indexing structure for fixing the resilient member relative to the front and back link members and for resisting slippage of the resilient member relative to the front and back link members.

11. A bicycle seat suspension as defined in claim 10 wherein the indexing structure includes one or more protruding elements extending from the resilient member and one or more complementary recesses in the front and back link members for receiving the protruding elements.

12. A bicycle seat suspension as defined in claim 11 wherein the resilient member comprises a molded elastomeric material and the protruding elements comprise outwardly extending pins molded in place in the elastomeric material.

13. A bicycle seat suspension as defined in claim 6 wherein the upper and lower cross links are pivotally connected to the front and back link members by means of transversely extending pivot pins.

14. A bicycle seat suspension as defined in claim 13 wherein each of the pivot pins includes a hollow interior.

15. A bicycle seat suspension as defined in claim 14 wherein each on the pivot pins further includes an outer surface and a hole extending through the outer surface and opening into the hollow interior.

16. A bicycle seat suspension as defined in claim 15 wherein the hollow interior of each pivot pin is packed with lubricant that flows through the hole to keep the outer surface of the pivot pin lubricated.

17. In a bicycle seat suspension system of the type having a parallelogram linkage and a resilient member positioned between two substantially parallel arms of the parallelogram linkage, the improvement comprising providing one or more apropriately dimensioned and positioned holes in the resilient member so as to obtain a desired restoring force response as the resilient member is compressed between the parallel arms of the parallelogram linkage.

18. In a bicycle seat suspension system of the type having a parallelogram linkage and a resilient member positioned between two substantially parallel arms of the parallelogram linkage, the improvement comprising incorporating materials having two or more different elastomeric properties into different regions of the resilient member so as to obtain a desired restoring force response as the resilient member is compressed between the parallel arms of the parallelogram linkage.

19. The improvement as defined in claim 18 wherein the resilient member includes a first component formed of a first elastomeric material and a second component removably joinable with the first component formed of a second elastomeric material.

20. The improvement as defined in claim 19 wherein additional removably joinable components are provided, each having a different elastomeric property, and selected ones of the removably joinable components are joined to the first component so as to achieve a desired restoring force response.

21. A universal adapter system for adapting a bicycle seat post of fixed dimension to a bicycle frame tubing member of larger dimension, said universal adapter system comprising:
   a universal sleeve having an inner diameter matched to the fixed dimension of the seat post and an outer diameter greater than the inner diameter but less than the dimension of the bicycle frame tubing member; and
   a shim between the universal sleeve and the bicycle tubing member for substantially filling the space between the universal sleeve and the bicycle frame tubing member, the shim comprising a length of ribbon wrapped around the exterior of the universal sleeve.

22. A universal adapter system as defined in claim 21 wherein the ribbon is of a known substantially constant thickness and wherein the length of the ribbon is selected so as substantially to fill the gap between the universal sleeve and the bicycle frame tubing member.

* * * * *